United States Patent [19]
Govindaraj et al.

[11] Patent Number: 6,144,895
[45] Date of Patent: *Nov. 7, 2000

[54] SYSTEM AND METHOD FOR NETWORKING A COMPUTER NUMERICAL CONTROL WITH A WORKSTATION

[75] Inventors: Subbian Govindaraj, South Euclid; William C. Schwarz, Shaker Heights; James M. Slagter, Lyndhurst; Michael Piatka, Mentor, all of Ohio

[73] Assignee: Allen-Bradley Company, LLC, Milwaukee, Wis.

[ * ] Notice: This patent is subject to a terminal disclaimer.

[21] Appl. No.: 08/979,128

[22] Filed: Nov. 26, 1997

[51] Int. Cl.⁷ ............................. G06F 19/00; G06G 7/66
[52] U.S. Cl. ............................. 700/181; 700/56; 700/97; 700/104; 700/145; 700/165; 700/182
[58] Field of Search ............................................. 700/181

[56] References Cited

U.S. PATENT DOCUMENTS

| | | | |
|---|---|---|---|
| 5,617,528 | 4/1997 | Stechmann et al. | 395/326 |
| 5,652,866 | 7/1997 | Aldred et al. | 395/500 |
| 5,691,897 | 11/1997 | Brown et al. | 364/167.02 |
| 5,737,523 | 4/1998 | Callaghan et al. | 395/187.01 |
| 5,764,155 | 6/1998 | Kertesz et al. | 340/825.08 |
| 5,822,207 | 10/1998 | Hazama et al. | 364/468.03 |
| 5,828,575 | 10/1998 | Sakai | 364/474.24 |
| 5,852,441 | 12/1998 | Nakajima et al. | 345/352 |

OTHER PUBLICATIONS

Walter Stanislowski, "Instrument Control Enhancements Using Microsoft Windows 3.0", IEEE 1992, pp. 239–242.
Dorin Carstoiu et al., "Netware Dynamic Data Exchange", IEEE 1994, pp. 284–287.
Barcellos et al., "A Novel Waveform Analyzer For Analog and Digital Signals For The Windows® Environment".

*Primary Examiner*—William Grant
*Assistant Examiner*—McDieunel Marc
*Attorney, Agent, or Firm*—Fletcher, Yoder & Van Someren

[57] ABSTRACT

A system combines an open control interface workstation, e.g., a properly configured personal computer, with a networked computer numerical control. The personal computer and CNC are preferably linked to a local area network such as an Ethernet network. The open control interface is configured to utilize Windows DDE, or other protocol, to accomplish process-to-process communications with other DDE-compliant Windows applications. Additionally, the open control interface is designed to allow DDE-compliant Windows applications to communicate with one or more networked computer numerical controls while minimizing data flow over the network.

22 Claims, 5 Drawing Sheets

SYSTEM AND METHOD FOR NETWORKING A COMPUTER NUMERICAL CONTROL WITH A WORKSTATION

FIELD OF THE INVENTION

The present invention relates generally to a computer numerical control (CNC) connected to a workstation, such as a personal computer, and particularly to a system for networking a CNC with a workstation using standard interprocess communication methods that permit the workstation to be linked with a variety of devices and applications.

BACKGROUND OF THE INVENTION

A variety of controls are used to monitor and control various types of machine motion. For example, processor based controls, such as computer numerical controls or CNCs, are used to control the motion of machines, such as machine tools, that are used in a variety of manufacturing environments. A CNC, for instance, may be used to control the movements of a cutter on a machine tool when machining a part or component for use in the manufacture of a given product.

CNC-type controllers have become very popular due, in part, to their adaptability and relative ease-of-use in controlling machine motion. When machining a part, for example, a machine motion control program, e.g., part program, simply can be loaded into the CNC which then causes the machine to move according to the commands established by the part program. The control is designed to read the part program instructions and provide appropriate outputs to the various servos, stepper motors, etc. that physically move the components of the machine. The CNC also may be used to monitor multiple items related to motion control. For example, in a closed loop type system, a variety of sensors are disposed on the machine to provide outputs to the CNC indicative of various parameters, such as position and speed, so the CNC can compare the sensed parameters with the programmed parameters to detect and correct for any error between the values. As is understood by those of ordinary skill in the art, CNC-type controllers are able to process a wide variety of data related to controlling machine motion, monitoring machine motion, storing and manipulating of part program data, etc.

Traditionally, CNCs have been configured in various ways depending on the CNC design as established by the CNC manufacturer and/or end user. For instance, CNCs typically have included a visual interface, such as a CRT, and a keyboard that allow machine control programs to be entered or edited directly at the CNC. In some systems, machine control programs can be prepared offsite at a workstation, such as a personal computer, that is configured to permit an operator to prepare motion control programs in a language/syntax that is recognizable and useable by the CNC. The program is then loaded onto a storage medium, such as a punch tape, magnetic tape or diskette, and physically taken to the CNC where it is downloaded for use by the CNC in controlling machine motion. For some applications, the program may be transferred electronically from the personal computer to the CNC for execution. In any of these situations, the motion control program must be prepared in a format recognizable and useable by the CNC.

Simultaneously with the development of CNC-type machine controllers, computer networks and personal computers have evolved. Computer networks are now available to permit linking of multiple personal computers and other devices across a single network. For example, local area networks (LANs), such as an Ethernet network, can be used to connect multiple personal computers and data servers with each other and with other devices, e.g., printers and various instruments. The common network allows data to be transferred between the various devices linked to the network.

To permit the networked personal computers and other devices to communicate, it is necessary that the devices have compatible application programming interfaces (APIs) to permit data exchange. In the personal computer area, some common API choices are "C" application programming interfaces (CAPI), dynamic data exchange (DDE™) and object linking and embedding (OLE) automation. Each of these choices has its own advantages and disadvantages depending on the PC operating systems, requirements for support on multiple operating systems, and technologies involved.

For example, DDE has become a very popular data exchange mechanism between Windows™-based applications. When using personal computers having Windows-based operating systems, such as Windows NT™ and Windows 95™, DDE may be the data exchange mechanism of choice.

With respect to both stand alone personal computers and networked personal computers, the trend has been toward utilization of Windows-based applications. Consequently, a large percentage of personal computers presently have operating systems that utilize Windows-based applications. In many manufacturing and other machine control environments, it would be advantageous to network one or more CNCs with one or more PC based workstations using Windows. Heretofore, however, machine control and CNC command protocols have not been amenable for use with Windows-based applications or other common operating systems. Although the DDE data exchange mechanism, for instance, has been used routinely with Windows to accomplish process-to-process communications, this protocol has not been available for networked CNCs. (It should be noted that DDE, Windows, WindowsNT and Windows95 are trademarks of Microsoft Corporation.)

The present invention addresses the various drawbacks and disadvantages of current CNCs in light of the changes and advances in personal computing and networking.

SUMMARY OF THE INVENTION

The present invention relates to a system that combines a workstation having a central processing unit and an open control interface with a computer numerical control (CNC) designed to control machine motion. The open control interface typically utilizes a personal computer. The system comprises an open control interface using a process-to-process communication protocol and a computer numerical control. A machine is coupled to the computer numerical control such that motion of the machine may be controlled by the computer numerical control. The computer numerical control includes at least one processor configured to maintain a watchlist of data related to control of the machine.

A network is coupled between the open control interface and the computer numerical control to carry communications therebetween. The network is also available to carry communications between additional networked devices. Furthermore, the open control interface is configured to convert data entered at the open control interface via a data entry component, e.g., a keyboard, into a CNC control format such that an operator can read and write data and execute commands on the networked computer numerical control through the open control interface. The CNC processor is configured to transmit data over the network to the data server only when an item on the watchlist changes, thereby preserving network bandwidth and personal computer CPU bandwidth.

According to another aspect of the invention, an open control interface utilizes a personal computer to facilitate accessing large varieties of CNC data resident on a CNC and providing commands to the CNC. The open control interface comprises a personal computer having an operating system that is Windows based and on which a Windows-compliant application may be run. The open control interface further comprises a protocol conversion module, preferably a data server, and an application program interface configured to establish a link for data transfer between the Windows-compliant application and the data server. The data transferred may include, for example, instructions to read and write data or to execute commands. A network driver cooperates with the data server to send data through a network to which the CNC may be linked. The data server converts data received from the Windows-compliant application into a format suitable for use with a CNC. The data server also converts data received from the CNC into a format that may be used on the personal computer utilizing the Windows-compliant application.

According to another aspect of the present invention, a method is provided for facilitating communication between a CNC and a personal computer having a Windows-based operating system. The method comprises placing a CNC in communication with a network capable of carrying data between a plurality of devices. The method further comprises placing a personal computer, having a Windows-based operating system, in communication with the network and entering machine control related data via the personal computer. The method also comprises converting the machine control related data to a format recognizable and useable by the CNC and transmitting the converted machine control related data over the network to the CNC.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
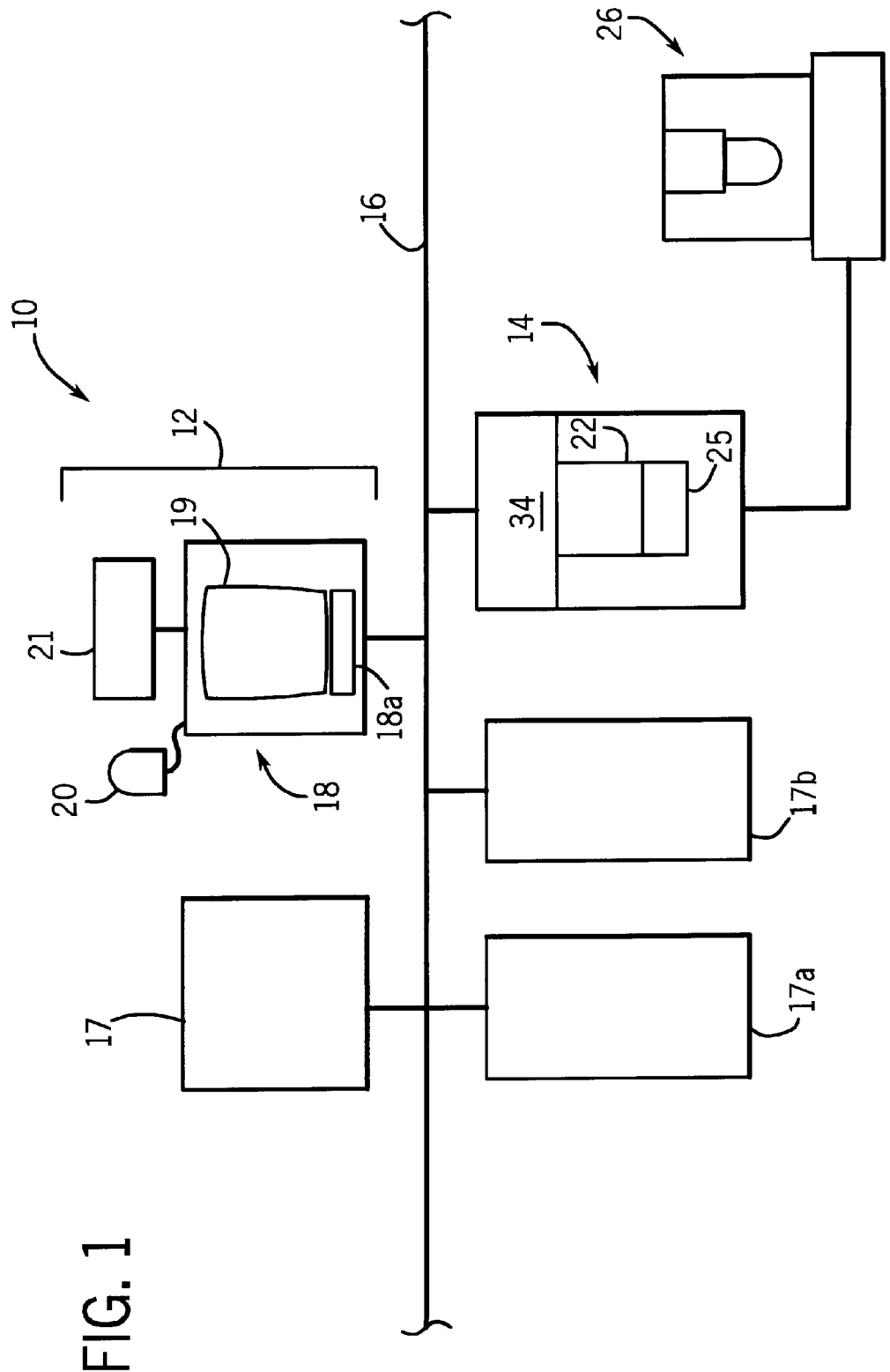
FIG. 1 is a schematic view of a networked workstation and CNC, according to a preferred embodiment of the present invention.

Referring generally to FIG. 1, a system 10 is illustrated according to a preferred embodiment of the present invention. System 10 includes at least one workstation 12 and at least one computer numerical control (CNC) 14. Workstation 12 and CNC 14 are linked to a network 16 that allows workstation 12 to communicate with CNC 14. System 10 is designed such that workstation 12 and CNC 14 may communicate with additional PCs (e.g., PC 17). The use of network 16 also allows workstation 12, any additional PCs, and other devices 17a and 17b (e.g., other CNCs, printers, sensor devices, instruments, etc.) potentially to exchange information and to communicate with each other over network 16. Basically, system 10 utilizes a workstation having a standard process-to-process communication protocol in a commonly used operating system and translates the process-to-process communication protocol to a CNC compatible protocol, or vice versa, for communication with a networked CNC.

Workstation 12 preferably comprises a personal computer 18 that may be of a variety of standard configurations. However, an exemplary personal computer 18 includes a central processing unit (CPU) 18a configured with a Pentium™ processor rated at 75 MHz or higher. The exemplary PC also has 20 megabytes or more of RAM and at least 30 megabytes of available hard disk space. The exemplary PC includes either a VGA or SVGA monitor 19, a mouse 20 and a keyboard 21 for entering data.

Furthermore, workstation 12 comprises a common operating system, such as a Windows-based operating system or a UNIX operating system. Preferably, workstation 12 comprises a Windows-based operating system and includes a Windows-based software package, such as WindowsNT. Other Windows packages, such as Windows95 also could be used in system 10. Workstation 12 also implements a protocol that allows process-to-process communications. In the preferred embodiment, the protocol utilizes the Dynamic Data Exchange (DDE) communications protocol to allow one DDE-compliant Windows application to communicate with another DDE-compliant Windows application linked to network 16. However, system 10 may be adapted to use other application programming interfaces, such as "C" application programming interface (CAPI) or Object Linking and Embedding (OLE) automation, that also can be adapted to accomplish desired process-to-process communication. Because of their differing protocols, CNCs traditionally have not been amenable for communication with such application programming interfaces that utilize Windows-based applications. Thus, the adaptability and flexibility of Windows-based operating systems have not been sufficiently available in CNC environments.

Network 16 may comprise a variety of network types, e.g., WANs or LANs, but in most applications it is a local area network (LAN). For example, network 16 preferably is an Ethernet TCP/IP network that is readily useable for the linking of multiple personal computers, CNCs and other devices and applications.

CNC 14 includes one or more processors 22 that cooperate with a CNC executive 24 to receive data from workstation 12 and to communicate data back to workstation 12. The CNC executive 24, along with processor 22, also executes commands, e.g. part program commands, and monitors the motion and other parameters of a machine under its control. Part programs and other data can be loaded into a CNC memory 25. An exemplary CNC 14 is a 9/Series CNC using a 9/260 or 9/290 processor available from Allen-Bradley Company, Inc., located at 1201 South $2^{nd}$ Street, Milwaukee, Wis. However, CNC 14 potentially can be selected from a variety of types or brands of computer numerical controls adapted for linking to network 16. With a different type or brand of CNC, the protocol conversion must be adapted to accommodate the specific protocol, if different, used for that CNC.

In a typical environment requiring motion control, CNC 14 is connected to a machine 26, such as a machine tool. Machine tools are used to perform a variety of operations, including milling, drilling, boring, and grinding. However, CNC 14 can be used to control a variety of other types of machines and processes, including coordinate measuring and part manipulation. In any of these situations, CNC 14 can be adapted to provide the necessary control of machine motion to carry out the desired process as is understood by those of ordinary skill in the art. System 10 provides an operator with the convenience, flexibility, adaptability and multiple uses of a Windows-based operating system in reading and writing data as well as providing commands to one or more CNCs 14 responsible for controlling the motion of a variety of machines used in production and manufacturing environments.

Figure 2:
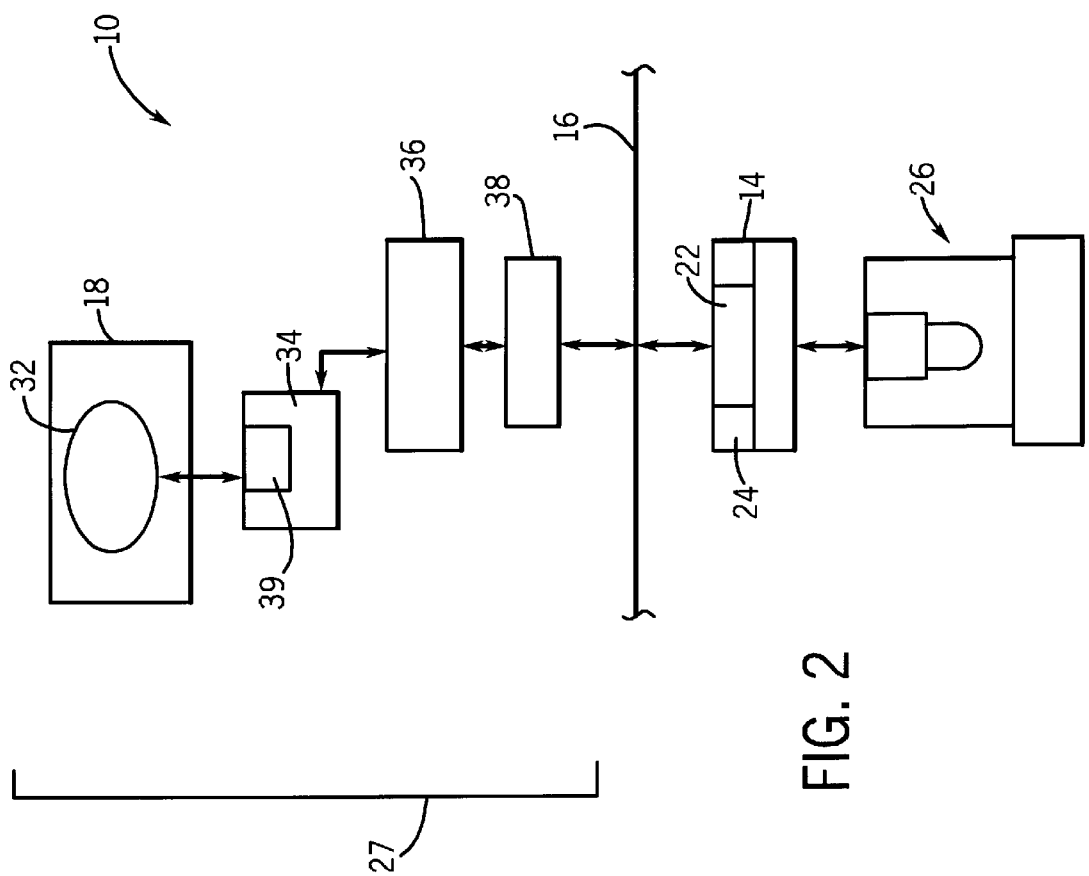
FIG. 2 is an illustration of a portion of an open control interface adapted to communicate with a CNC, according to a preferred embodiment of the present invention.
Figure 3:
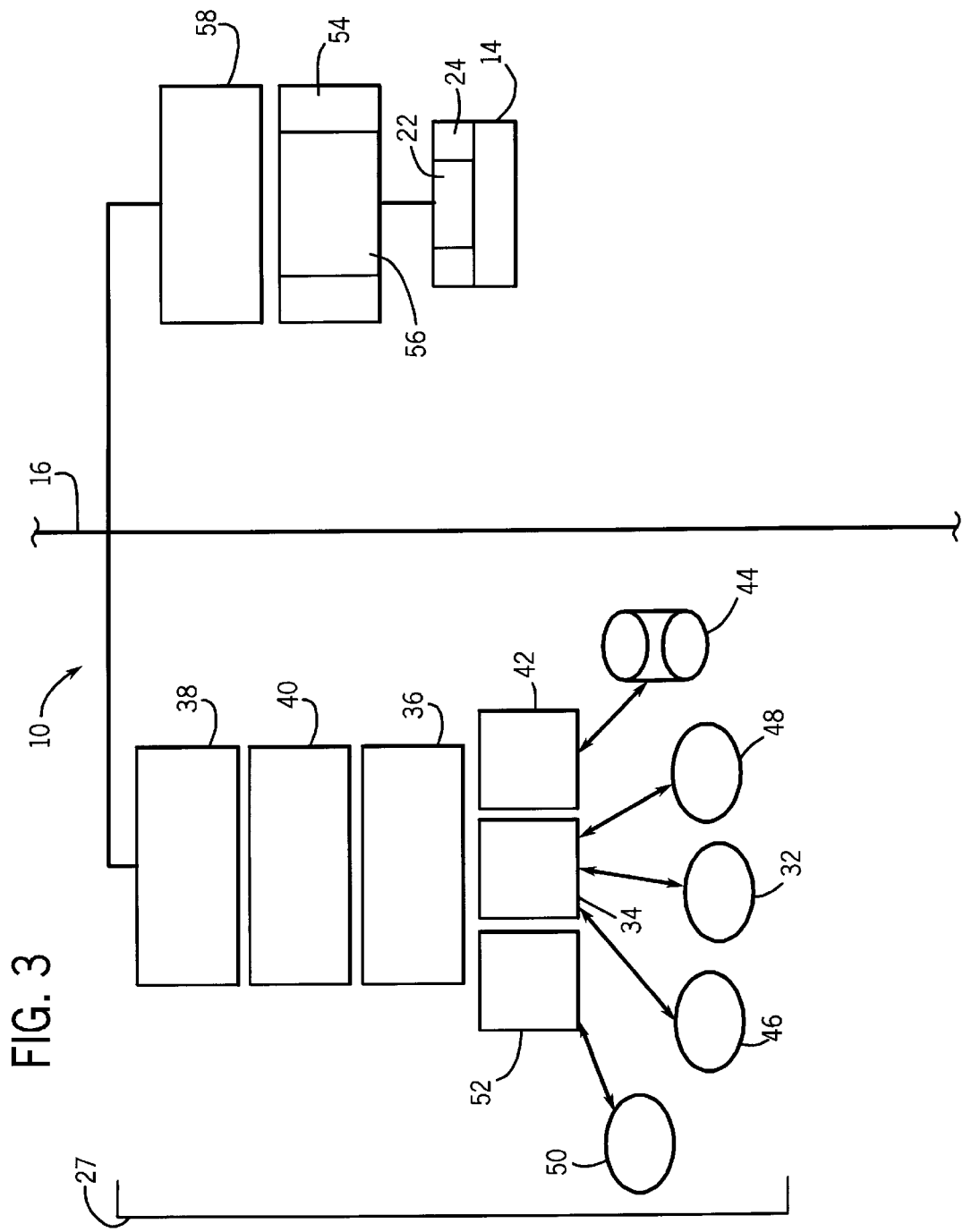
FIG. 3 is an illustration of one preferred open control interface architecture used with the workstation/CNC system illustrated in FIG. 1.
Figure 4:
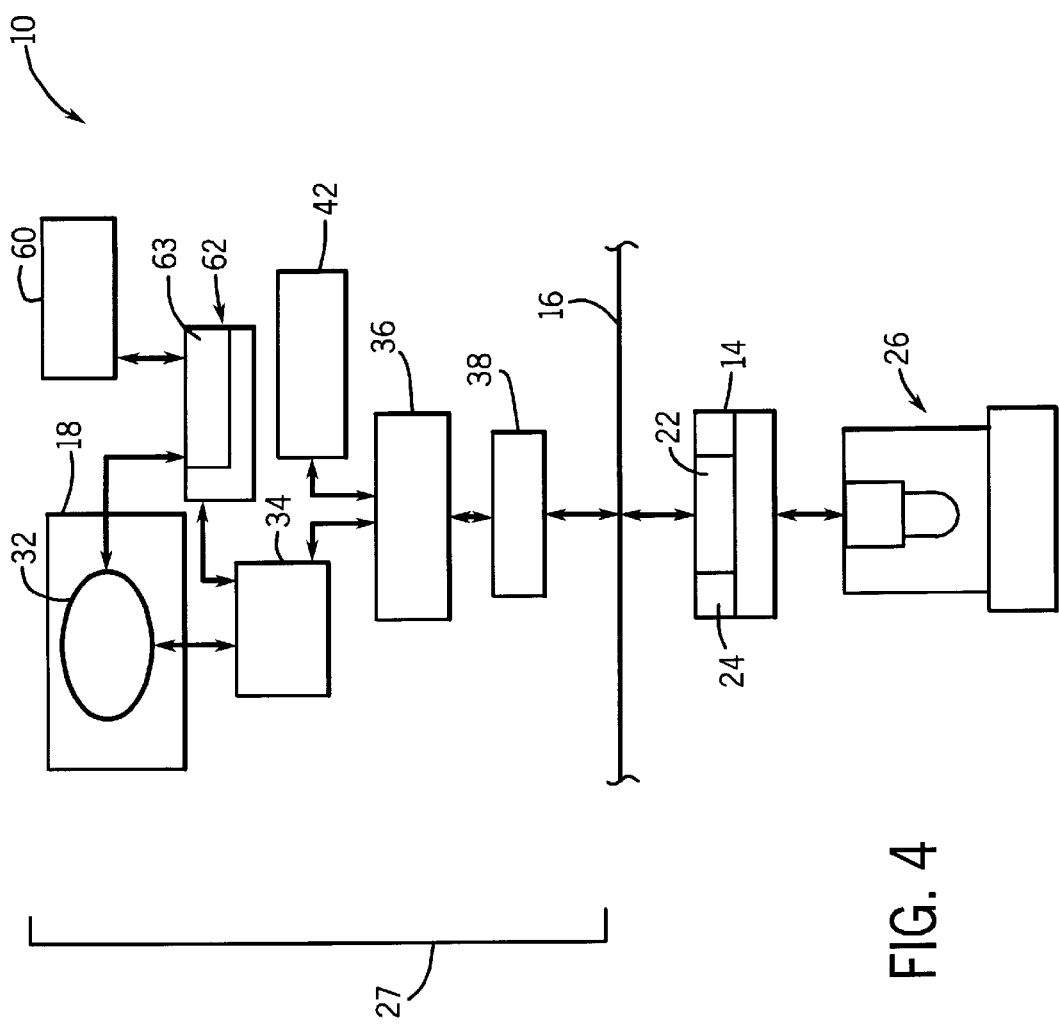
FIG. 4 is an illustration of additional software modules that can be used with the open control interface illustrated in FIG. 2.
Figure 5:
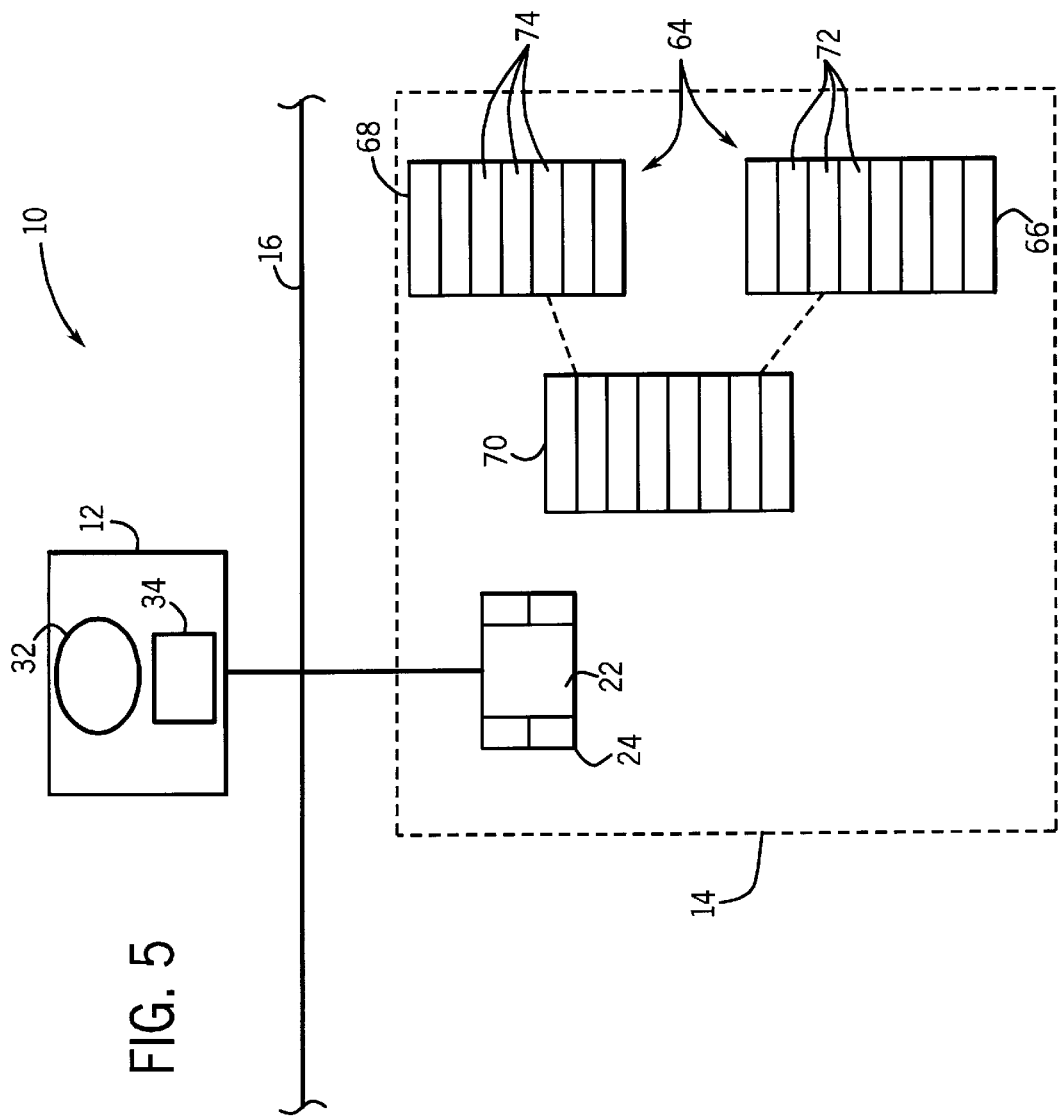
FIG. 5 is a schematic representation of watchlists maintained by a CNC, according to a preferred embodiment of the present invention.

Referring generally to FIGS. 2–4, a preferred embodiment of system 10 will be further described. In this preferred embodiment, it should be assumed that the Windows-based operating system is Windows NT version 4.0 or higher, and the process-to-process communication protocol is Dynamic Data Exchange. Thus, workstation 12 is configured for DDE-compliant Windows applications. However, the present invention should not be construed as limited to this configuration and is adaptable to other versions of Windows, other compatible process-to-process communication protocols and other network types.

The general implementation of a preferred embodiment of system 10 is illustrated in FIG. 2. System 10, and specifically workstation 12, uses an open control interface 27 that utilizes a Windows-based operating system. Open control interface 27 is sometimes referred to as an intelligent front panel as opposed to a dedicated front panel used on a conventional CNC. Open control interface 27 typically includes a personal computer 18, such as the conventional PC described above. In the preferred embodiment, open control interface 27 combines a WindowsNT operating system with Dynamic Data Exchange communication protocol so that a variety of DDE-compliant Windows-based applications, e.g., DDE-compliant Windows application 32, may be used on system 10.

The DDE-compliant application 32 communicates with a conversion module 34 which converts DDE protocol communications/data from the DDE-compliant Windows application 32 to a CNC-compatible protocol. Additionally, conversion module 34 converts data received from CNC 14 into DDE-compliant data that is passed back to DDE-compliant application 32.

Conversion module 34 cooperates with a communication management module 36, preferably a client server, which effectively manages data flow between conversion module 34 and an appropriate network interface 38 so that the data supplied from conversion module 34 is encoded for transmission across network 16. For example, the client server 36 may encapsulate validated DDE requests provided to conversion module 34; place them into the appropriate parameterized CNC command protocol; and send them to the appropriate CNC 14 over network 16. In this preferred embodiment, network 16 is an Ethernet network and network interface 38 comprises a TCP/IP compatible Ethernet card, such as the Etherlink III™ distributed by 3Com Corporation. Communication management module 36 handles both data from conversion module 34 that is sent to CNC 14 and also data communicated from CNC 14 to conversion module 34.

In the preferred embodiment, conversion module 34 is a data server. An exemplary data server for use with a CNC, such as the Allen-Bradley 9/Series CNC, is the 9/Series OCI Data Server, catalog number 8520-IFP1, that utilizes a software module 39 referred to as RS Server Toolkit™, catalog number 9355WABOEMM, to facilitate translation to the appropriate DDE or CNC protocol used in this exemplary system. The 9/Series OCI Data Server is available from the Allen-Bradley Company, and the RS Server Toolkit is available from Rockwell Software, Inc., a subsidiary of Allen-Bradley Company, Inc. and located at 6680 Beta Drive, Cleveland, Ohio 44143. Additionally, for this embodiment, a preferred communication management module 36 is also available from Rockwell Software and is referred to as RSLinx™, catalog number 9355WABOEMM.

The combination of conversion module 34, communication management module 36 and network interface 38 provides for the reading and writing of data as well as the communication of commands, entered via DDE-compliant application 32, with a CNC 14, such as the 9/Series CNC. The communications (e.g., data organized in packets appropriate for a given network) are transmitted over network 16. Thus, the motion of machine 26 may be affected and monitored via standard PC 18 utilizing a Windows-based operating system. This provides great flexibility in the use of PC 18, not only with the preferred CNC 14, but potentially with other Windows-compliant devices and other Windows-based applications linked to network 16.

A more detailed schematic of the software architecture of open control interface 27 is illustrated in FIG. 3. As described previously, a DDE-compliant Windows application 32 communicates with a conversion module/data server 34 which, in turn, communicates with communication management module 36. The data server converts communications following DDE protocol into an appropriate protocol that is recognizable and useable by CNC 14. In the preferred embodiment, communication management module 36 utilizes a communication tool 40, such as the WinSock™ communication tool software available from Microsoft Corporation. These tools provide for the interchange of data, including commands, with CNC 14 via network interface 38 which, in the preferred embodiment, is a TCP/IP Ethernet card having a WinSock-compliant driver (e.g., 3Com Corporation's Ethernet III card).

In addition to the basic software components outlined above, the open control interface 27, preferably includes a file handler 42. File handler 42 cooperates with communication management module 36 and a storage medium, such as a hard disk 44, of personal computer 18. File handler 42 typically is a software module that provides an interface between the hard drive 44 of PC 18 (or another networked drive) and the CNC 14. This configuration allows an operator to use the hard drive 44 as a location for CNC motion control program storage as well as program execution. The file handler 42, in cooperation with communication tool 40 and network interface 38, provides for the intercommunication of data between CNC 14 and hard drive 44. The exact design or configuration of file handler 42 depends on the particular type of CNC and CNC protocol used in system 10. However, a preferred file handler 42, for use with the exemplary networked 9/Series CNC discussed above, is the 9/Series OCI CNC File Handler, catalog number 8520-IFP1, available from the Allen-Bradley Company. With this type of file handler, CNC 14 easily can copy and execute part programs that are located in the personal computer directory. Often, however, the part program is loaded on the CNC to minimize the network traffic and to eliminate the time required for transferring part program data over the network during execution of the program. Loading the part program on the CNC is particularly helpful when the program includes very short data blocks used to control certain motions of machine 26.

The architecture of open control interface 27 facilitates the use of additional CNC applications 46 as well as other third party applications 48 on personal computer 18. The DDE-compliant conversion module/data server 34 allows such Windows-compliant third party applications and CNC applications to be used for the reading and writing of data to CNC 14 or other CNCs or devices linked to network 16, provided the data is appropriately addressed for transfer to and from those other devices, e.g., devices 17a and 17b or PC 17. For example, Windows-compliant spreadsheet applications or graphics applications can be loaded onto PC 18 and used to directly access CNC data with no special modification.

Furthermore, open control interface 27 remains amenable for use with offline development systems 50, such as the Allen-Bradley Offline Development System (ODS), catalog number 8520-ODS, that allow a user to create, edit, document, and troubleshoot machine configuration, machine interfaces, and machine motion control files. The offline development system 50 also can be used with system 10 to upload and download part programs in a manner similar to the use of offline development systems with standard dedicated CNCs. When offline development system 50 is connected over a network, such as network 16, it requires an appropriate driver 52, such as the RSI Virtual Device Driver™, catalog number 9355WABOEMM, available from Rockwell Software. Driver 52 cooperates with communication management module/client server 36 to implement communications with CNC 14.

On the CNC side of system 10, CNC 14 communicates with a communications module 54. Communications module 54 includes an appropriate client server 56 adapted to obtain the necessary protocol parts, such as instructions to read data, write data or execute commands, from the data packets that are received over network 16 from DDE-compliant application 32 and data server 34. The client server 56 presents these instructions/requests to CNC 14 where they are appropriately processed by CNC processor 22 and executive 24. Communications module 54 cooperates with a driver 58 such as an Ethernet TCP/IP driver, to send and receive data and commands over Ethernet network 16.

The design of communications module 54 and client server 56 depends on the preferred CNCs and protocols implemented in system 10. However, in the exemplary preferred embodiment, an Ethernet module, such as the OCI Ethernet module, catalog number 8520-ETCP, available from the Allen-Bradley Company, may be used as an interface between the 9/Series CNC and an Ethernet TCP/IP compatible network. This type of Ethernet module provides for commands and data transfers to/from systems running a suitable conversion module/data server 34. The Ethernet module also passes through instructions from conversion module/data server 34 to the CNC regarding the transfer of CNC part programs from file handler 42 (the CNC then sends the appropriate request to file handler 42 for the desired part program); facilitates transmission of commands and file transfers from off-line development system 50; and allows updates to be made to the CNC executive.

As illustrated in FIG. 4, certain other features may be combined with system 10 to enhance performance, adaptability and ease-of-use for the operator. For example, different types of Windows-compliant CNC related applications can be used on PC 18 and the open control interface 27. However, a customized display set 60 may be helpful in allowing a user to prepare an operator interface having desired screens displayed on the monitor 19 of PC 18. The screens can be customized, for instance, to emulate screens with which the operator is familiar. For example, the 9/Series Basic Display Set, available from the Allen-Bradley Company, is a DDE-compliant application that provides the user interface between PC 18 and CNC 14, e.g., a 9/Series CNC. This software emulates the 9/Series CNC screens and allows the user to control, program, position and monitor the CNC via an interface that is recognized and comfortable for the operator to use.

Additionally, a performance enhancement software module 62 may be used to provide enhanced performance for systems implementing Rockwell Software's AdvanceDDE™ protocol. For example, Rockwell Software supplies a software module called RSData™, catalog number 9361DATAOCXOEM, that can be used with suitable DDE-compliant applications 32 and conversion module/data server 34 to provide enhanced performance in a system that conforms to the AdvanceDDE protocol. RSData takes advantage of a high speed DDE communications module 63, such as Rockwell Software's RSJunctionBox™, catalog number 9361JBOXOEM, that facilitates considerably higher performance between appropriate DDE-compliant applications and data servers. The foregoing provides examples of potential modifications to system 10.

Another advantage of system 10 is its unique ability to preserve both CPU and network bandwidth by limiting the flow of data over network 16 between CNC 14 and PC 18. In other networked systems, network devices are continuously polled for data over the network by a workstation, e.g., a PC. However, with system 10, the polling of data is performed internally to CNC 14 by processor 22, and data is transmitted over network 16 to workstation 12 only when necessary or at select, limited times. This preserves not only network bandwidth but also the personal computer's CPU 18a bandwidth by releasing the CPU from handling the polling tasks and allowing PC 18 to communicate with other networked devices or run other applications. Without the ability to push polling responsibility to the CNC 14, certain machining environments or CNC applications might require a dedicated PC.

In some situations, CPU bandwidth preferably is further preserved by pushing other data handling tasks to the CNC, e.g. loading part programs directly into the CNC; by utilizing the greater efficiency of AdvanceDDE protocol; and by bundling related and/or unrelated pieces of data that are sent over network 16 to CNC 14 as "bundled packets". The use of bundled packets reduces the time otherwise spent by CPU 25 in managing the transfer of numerous smaller pieces of data.

In the preferred embodiment, at least one watchlist 64 is maintained on processor 22 instead of workstation 12. This maintains a greater bandwidth and improved network performance compared to conventional network arrangements that require continuous network data traffic due to polling from one or more workstations.

In this exemplary embodiment, DDE-compliant application 32 makes a DDE request to conversion module/data server 34 which, in turn, converts the request to a format or AI protocol compatible with CNC 14 and adds the request to a watchlist 64 maintained on CNC 14. CNC 14 polls the data pursuant to the request and transfers data back to data server 34 only when an item on the watchlist changes, thereby reducing network traffic. Processor 22 of CNC 14 may be configured to maintain multiple watchlists for multiple DDE-compliant applications on multiple workstations 12. In this latter implementation of system 10, CNC 14 sends data to the appropriate requesting workstation when a monitored data item on one of the watchlists changes.

Preferably, CNC 14 maintains a pair of watchlists for a given workstation (e.g. workstation 12), such as a foreground watchlist 66 and a background watchlist 68. Depending on the type of data item requested by conversion module/data server 34, the item is added to the appropriate watchlist. For example, the foreground watchlist may be configured for items that the system designer wishes to poll during each predesignated system scan. Background watchlist items, on the other hand, may be polled only when there is excess time available during a system scan time. Thus, the system may be designed to handle different types of watchlist data items according to different levels of priority by addressing certain data items for the background watchlist 68 and other items for the foreground watchlist 66.

Additionally, both the foreground watchlist 66 and the background watchlist 68 preferably are in communication with a watchlist buffer 70. Watchlist buffer 70 is helpful in managing the transmission of data packets that are sent from foreground watchlist 66 and background watchlist 68 over network 16 to conversion module/data server 34. Data server 34, of course, converts the information into a DDE format and forwards them to the DDE-compliant application 32. Typically, foreground watchlist 66 is designed to have capacity for multiple watchlist entries 72, and background watchlist 68 is similarly designed to accommodate multiple watchlist entries 74. As changes occur with respect to a data item in a given watchlist entry 72 or 74, those changes are sent to watchlist buffer 70 which effectively organizes the order of transmitting data packets over network 16 to conversion module/data server 34.

It will be understood that the foregoing description is of a preferred exemplary embodiment of this invention and that the invention is not limited to the specific forms shown. For example, the specific workstations, CNCs and various software modules that permit Windows-based operating systems to be networked with CNCs is of a preferred, illustrative embodiment only. As is understood by those of ordinary skill in the art, the specific conversion techniques and software module configurations depend on the specific protocols used in a given system, e.g., the specific Windows-based process-to-process protocol as well as the protocol or protocols recognized and used by a given CNC. Also, there are a variety of ways to address and otherwise format the data packets communicated between a given Windows-based application and a given CNC. The specific handling of data depends on the type of network used, the operating system version chosen, the need for linking with multiple types of operating systems, the brand or type of CNC and the other technologies incorporated into the system. However, these and other modifications may be made in the design and arrangement of the elements described above without departing from the scope of the invention as expressed in the appended claims.

What is claimed is:

1. A system that combines a workstation having a central processing unit and an open control interface with a computer numerical control designed to control machine motion, comprising:

an open control interface using a process-to-process communication protocol;

a computer numerical control having at least one processor;

a machine coupled to the computer numerical control, the motion of the machine being controlled by the computer numerical control;

a network coupled between the open control interface and the computer numerical control to carry communication between the open control interface and the computer numerical control, the network being available to carry communications between additional networked devices and the open control interface being configured to convert data entered via the open control interface into a computer numerical control format such that an operator can read and write data and execute commands on the computer numerical control through the open control interface wherein the at least one processor is configured to maintain a watchlist of data related to control of the machine and to transmit data over the network to the open control interface only when an item on the watchlist changes, thereby conserving network and personal computer central processing unit bandwidth.

2. The system as recited in claim 1, wherein the open control interface comprises a Windows-based operator interface.

3. The system as recited in claim 2, wherein the open control interface comprises a data server that provides an interface permitting the Windows-based operator interface to send and receive data from the computer numerical control.

4. The system as recited in claim 3, wherein the open control interface implements Dynamic Data Exchange (DDE) as its communication protocol for DDE-compliant Windows applications and the data server provides a DDE interface between the CNC control and DDE-compliant Windows applications.

5. The system as recited in claim 4, wherein the network comprises a local area network (LAN).

6. The system as recited in claim 4, wherein the network comprises an Ethernet network.

7. The system as recited in claim 6, further comprising at least one additional device coupled to the network and able to receive data from the open control interface and/or send data to the open control interface.

8. The system as recited in claim 1, wherein the network comprises an Ethernet network.

9. The system as recited in claim 1, wherein data is sent over the network to the computer numerical control in the form of bundled packets of data.

10. A system that combines a workstation having a central processing unit and an open control interface with a computer numerical control designed to control machine motion, comprising:

an open control interface using a process-to-process communication protocol;

a computer numerical control having at least one processor;

a machine coupled to the computer numerical control the motion of the machine being controlled by the computer numerical control;

a network coupled between the open control interface and the computer numerical control to carry communication between the open control interface and the computer numerical control, the network being available to carry communications between additional networked devices and the open control interface being configured to convert data entered via the open control interface into a computer numerical control format such that an operator can read and write data and execute commands on the computer numerical control through the open control interface, wherein the at least one processor is configured to maintain a watchlist of data related to control of the machine and to transmit data over the network to the open control interface only when an item on the watchlist changes, thereby conserving network and personal computer central processing unit bandwidth, wherein the data on the watchlist is polled internally by the computer numerical control via the at least one processor rather than from the open control interface.

11. The system as recited in claim 10, wherein an item of data is added or removed from the watchlist pursuant to a request from the data server.

12. An open control interface utilizing a personal computer to facilitate accessing large varieties of CNC data resident on a CNC and providing commands to the CNC, comprising:

a personal computer having an operating system that is Windows based and on which a Windows-compliant application may be run;

a protocol conversion module;

an application program interface configured to establish a link for data transfer between the Windows-compliant application and the protocol conversion module; and a network interface cooperating with the protocol conversion module to send data through a network to which the CNC is linked, wherein the protocol conversion module interacts with the Windows-compliant application to convert data received from the Windows-compliant application into a format suitable for use by a CNC and to convert data received from the CNC into a format appropriate for the Windows-compliant application resident on the personal computer.

13. The open control interface as recited in claim 12, further comprising a computer numerical control having a processor linked to the open control interface by a network, wherein the processor is configured to maintain a watchlist of data related to control of a machine and to transmit data over the network to the protocol conversion module only when an item on the watchlist changes, thereby conserving network and personal computer central processing unit bandwidth.

14. The open control interface as recited in claim 12, wherein the network driver is an Ethernet driver coupleable to an Ethernet network.

15. The open control interface as recited in claim 12, wherein the operating system utilizes Dynamic Data Exchange (DDE) to accomplish process-to-process communication of data between the Windows-compliant application and the protocol conversion module.

16. The open control interface as recited in claim 15, wherein multiple DDE-compliant applications can access data from the protocol conversion module.

17. A method for facilitating communication between a CNC and a personal computer having a Windows-based operating system, comprising:

placing a CNC in communication with a network capable of carrying data between a plurality of devices;

placing a personal computer, having a Windows-based operating system, in communication with the network;

entering machine control related data via the personal computer;

converting the machine control related data to a format recognizable and useable by the CNC; and transmitting the converted machine control related data over the network to the CNC.

18. The method as recited in claim 17, further comprising coupling the CNC to a machine, wherein the motion of the machine can be controlled or monitored in accordance with the machine control related data entered on the personal computer.

19. The method as recited in claim 17, further comprising: loading DDE-compliant applications onto the personal computer and configuring a data server to provide the DDE-compliant application access to the data server via a DDE link.

20. The method as recited in claim 19, wherein the step of converting includes converting data supplied to the data server in DDE format to a format recognizable and useable by the CNC.

21. The method as recited in claim 17, further comprising coupling the CNC to a machine tool, wherein the motion of the machine tool can be controlled or monitored in accordance with the machine tool control related data entered on the personal computer.

22. A method for facilitating communication between a CNC and a personal computer having a Windows-based operating system, comprising:

placing a CNC in communication with a network capable of carrying data between a plurality of devices;

placing a personal computer having a Windows-based operating system, in communication with the network;

entering machine control related data via the personal computer;

converting the machine control related data to a format recognizable and useable by the CNC; and transmitting the converted machine control related data over the network to the CNC, further comprising:

maintaining a watchlist of data items at the CNC;

polling the watchlist internally by the CNC; and transmitting data over the network to the personal computer when one of the data items changes.

* * * * *